United States Patent
Ginzburg

(10) Patent No.: US 7,187,912 B2
(45) Date of Patent: Mar. 6, 2007

(54) APPARATUS AND METHOD FOR WIRELESS LOCAL AREA NETWORK (LAN) ANTENNA SELECTION

(75) Inventor: Boris Ginzburg, Haifa (IL)

(73) Assignee: Intel Corporation, Santa Clara, CA (US)

( * ) Notice: Subject to any disclaimer, the term of this patent is extended or adjusted under 35 U.S.C. 154(b) by 409 days.

(21) Appl. No.: 10/812,384

(22) Filed: Mar. 30, 2004

(65) Prior Publication Data

US 2005/0227661 A1 Oct. 13, 2005

(51) Int. Cl.
*H04B 17/02* (2006.01)
*H04B 7/08* (2006.01)

(52) U.S. Cl. .................. 455/134; 455/135; 455/140

(58) Field of Classification Search ........... 455/101, 455/132–135, 140, 226.1, 226.2, 226.3, 277.1, 455/277.2; 370/334, 431, 464, 310
See application file for complete search history.

(56) References Cited

U.S. PATENT DOCUMENTS

| | | | | |
|---|---|---|---|---|
| 5,371,734 | A * | 12/1994 | Fischer | 370/311 |
| 6,687,492 | B1 * | 2/2004 | Sugar et al. | 455/276.1 |
| 6,934,299 | B2 * | 8/2005 | Kaatz | 370/459 |
| 2003/0137966 | A1 * | 7/2003 | Odman et al. | 370/347 |
| 2004/0246983 | A1 * | 12/2004 | Kaatz | 370/432 |
| 2005/0245298 | A1 * | 11/2005 | Mori | 455/575.7 |

* cited by examiner

*Primary Examiner*—Sonny Trinh
(74) *Attorney, Agent, or Firm*—Pearl Cohen Zedek Latzer LLP

(57) ABSTRACT

A radio frequency transceiver for a wireless local area network (LAN) may have two or more antennae. An active antenna that delivers a data-bearing signal having a signal quality at least as good as any of the antennae may be selected based upon measurements of the signal quality during a preamble field of data frames having a substantially longer preamble field than other data frames.

21 Claims, 3 Drawing Sheets

APPARATUS AND METHOD FOR WIRELESS LOCAL AREA NETWORK (LAN) ANTENNA SELECTION

BACKGROUND OF THE INVENTION

A major factor adversely affecting the indoor performance of a radio-frequency (RF) wireless local-area network (WLAN) is multipath fading, where the signal reaching the antenna of a receiving modem is subject to distortion due to the superimposition of multiple versions of the transmitted signal propagated over different paths. One manifestation of this distortion is that signals arriving by different paths are liable to cancel each other out, thereby attenuating the received signal to such a degree that the receiver can no longer reliably reconstruct the transmitted data. WLANs are designed to allow any of the transmitters and receivers to be moved within a certain range. However, multipath fading renders the received signal strength liable to appreciable fluctuation as the transmitter and/or receiver are moved from one location to another. Due to the relatively high radio frequencies used by RF WLANs, the received signal strength is liable to vary considerably over even a small distance. In order to mitigate the attenuative effect of multipath fading, an RF WLAN receiver commonly employs the technique of space-diversity reception, where the receiver compares the strength and/or signal-to-noise ratio of the signals received by a plurality of physically-separated receiving antennae, and selects the best signal.

ANSI/IEEE standard 802.11 "Wireless LAN Medium Access Control (MAC) and Physical Layer (PHY) Specifications", approved Mar. 19, 1999, specifies a data communications protocol for use at speeds of up to 2 million bits per second (Mbit/s) that enjoys great popularity in the WLAN marketplace. Several supplements and amendments to this standard have since been published. In particular, 802.11b, approved Sep. 16, 1999, extends the maximum transmission rate to 11 Mbit/s, and 802.11g, approved Jun. 27, 2003, specifies higher transmission speeds of up to 54 Mbit/s. The 802.11b standard specifies the use of the Frequency-Hopping Spread Spectrum (FHSS), Direct-Sequence Spread Spectrum (DSSS), and Complementary Code Keying (CCK) modulation modes for RF communications in the 2.4 gigahertz (GHz) Industrial, Scientific and Medical (ISM) band. Standard 802.11g also uses the Orthogonal Frequency Division Multiplex (OFDM) modulation mode. The 802.11 standard in combination with its supplements and amendments is hereinafter referred to as 802.11.

Standard 802.11 defines a physical-layer, data-transfer protocol called the Physical Layer Convergence Protocol (PLCP), in which data are encapsulated in frames known as PLCP Protocol Data Units (PPDUs). The standard suggests the use of the preamble field, which is the first transmitted portion of PPDUs, as an appropriate interval for antenna selection in a space-diversity receiver. For the FHSS mode, subclause 14.3.2.1.1 of the standard defines a preamble field synchronization (SYNC) subfield consisting of 80 bits of alternating ones and zeroes, lasting on the order of 80 microseconds, and suggests the use thereof as a basis for antenna selection in a receiver equipped with space-diversity reception. For the DSSS mode, subclause 15.2.3.1 defines the corresponding preamble field SYNC subfield that consists of 128 bits of scrambled ones, lasting on the order of 128 microseconds. For the OFDM mode, subclause 17.3.3 of 802.11a specifies the duration of the PLCP preamble field, which is on the order of 16 microseconds.

IEEE standard 802.11 WLAN receivers commonly perform comparative signal strength and signal-to-noise ratio measurements for each of the antennae during transmission of the preamble field. However, the relatively short duration of the preamble field in the 802.11g OFDM mode renders these measurements much less reliable, and receivers often fail to select the optimum antenna.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Some embodiments of the present invention are directed to a radio-frequency (RF) space-diversity receiver used for data-packet reception, and in particular to a method for improving the reliability of the process of selecting the active antenna, which is the antenna to be used for subsequent reception (and optionally transmission), by assessing the quality of the data-bearing signals received from a plurality of antennae during reception of a data frame that has a substantially longer preamble field than that of other data frames and is received at substantially regular intervals. The antenna selection by receivers implementing methods of some embodiments of the invention may result in a higher and more stable throughput in the presence of multipath fading.

By way of example, an embodiment is described where a wireless local-area network (WLAN) RF transceiver working in accordance with IEEE standard 802.11g assesses the signal quality from a plurality of antennae during the preamble field of beacon frames, repeated at substantially regular intervals having a configurable length, typically 100 milliseconds. The duration of the beacon frame preamble field is on the order of 128 microseconds, which is substantially longer than the duration of the preamble field of other received data frames used in other devices for the same purpose. It is to be understood that the hereinabove beacon frame preamble field duration is stated by way of example only, and may be subject to variations. However, this in no way detracts from the utility of the described embodiment, which relies on the duration of the beacon frame preamble field having a duration of at least several tens of microseconds.

Figure 1:
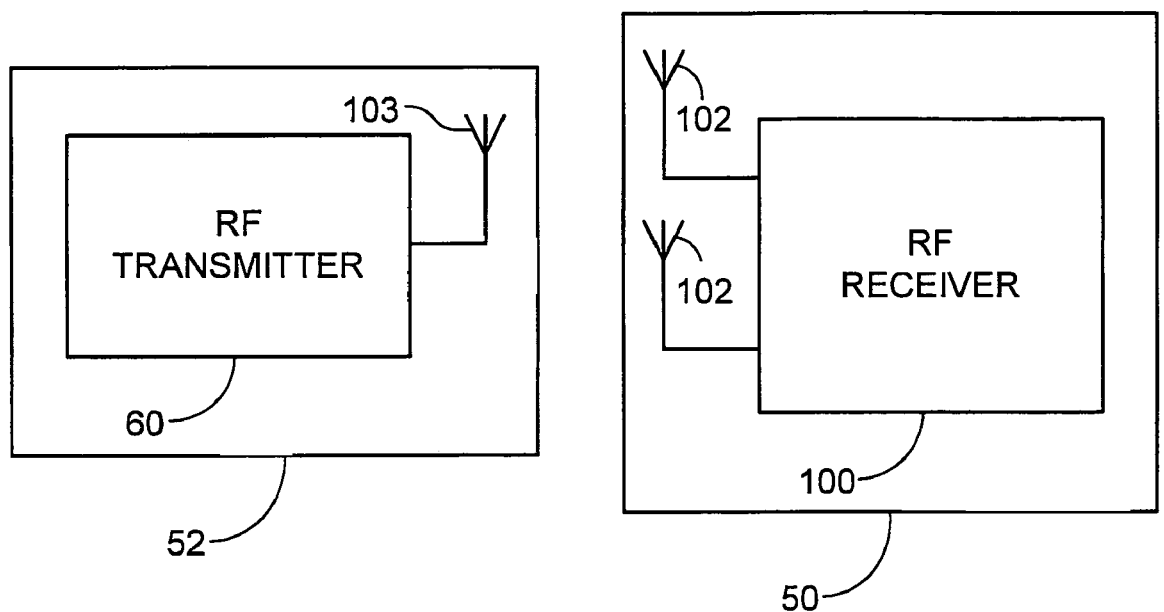
FIG. 1 is a schematic block-diagram illustration of an exemplary communication system, according to an embodiment of the present invention.

Reference is now made to FIG. 1, in which an exemplary RF communication system, in accordance with an embodiment of the present invention, is described. The hereinafter discussion should be followed while bearing in mind that the described blocks of the communication system are limited to those relevant to some embodiments of this invention, and that the described blocks may have additional functions that are irrelevant to these embodiments.

An RF communication system of the kind described in FIG. 1 may include at least two communication devices: a receiving device 50, and a transmitting device 52, capable of communicating over an RF channel. Receiving device 50 and transmitting device 52 may be, for example, WLAN mobile units, WLAN stationary units, WLAN add-on cards, WLAN Personal Computer and Memory Card International Association (PCMCIA) cards, WLAN personal computer (PC) cards, WLAN switches, WLAN routers, WLAN servers, Wi-Fi wireless communication devices, Bluetooth wireless communication devices, Zigbee wireless communication devices, game consoles, digital cameras, digital video cameras, television sets, desktop personal computers, workstations, servers, notebook computers, hand-held computers, personal digital assistants (PDAs), personal communication system (PCS) devices, very small aperture terminals (VSATs) for voice, internet and television broadcasting, and the like.

Receiving device 50 may include an RF receiver 100 connected to two or more receiving antennae 102 that may be spaced at a distance appropriate for space-diversity reception, in accordance with principles known by those of ordinary skill in the art. Receiving antennae 102 may be, for example, monopole antennae, dipole antennae, wire antennae, slot antennae, microstrip antennae, printed antennae, directional antennae, omnidirectional antennae, any combination thereof, or any other suitable antennae. Additionally, receiving device 50 may or may not also include an RF transmitter. Where receiving device 50 includes both a transmitter and a receiver, these may or may not share common antennae.

Transmitting device 52 may include an RF transmitter 60 connected to a transmitting antenna 103, and may or may not also include a receiver and one or more additional antennae for space-diversity reception. Where transmitting device 52 includes both a transmitter and a receiver, these may or may not share common antennae.

Figure 2:
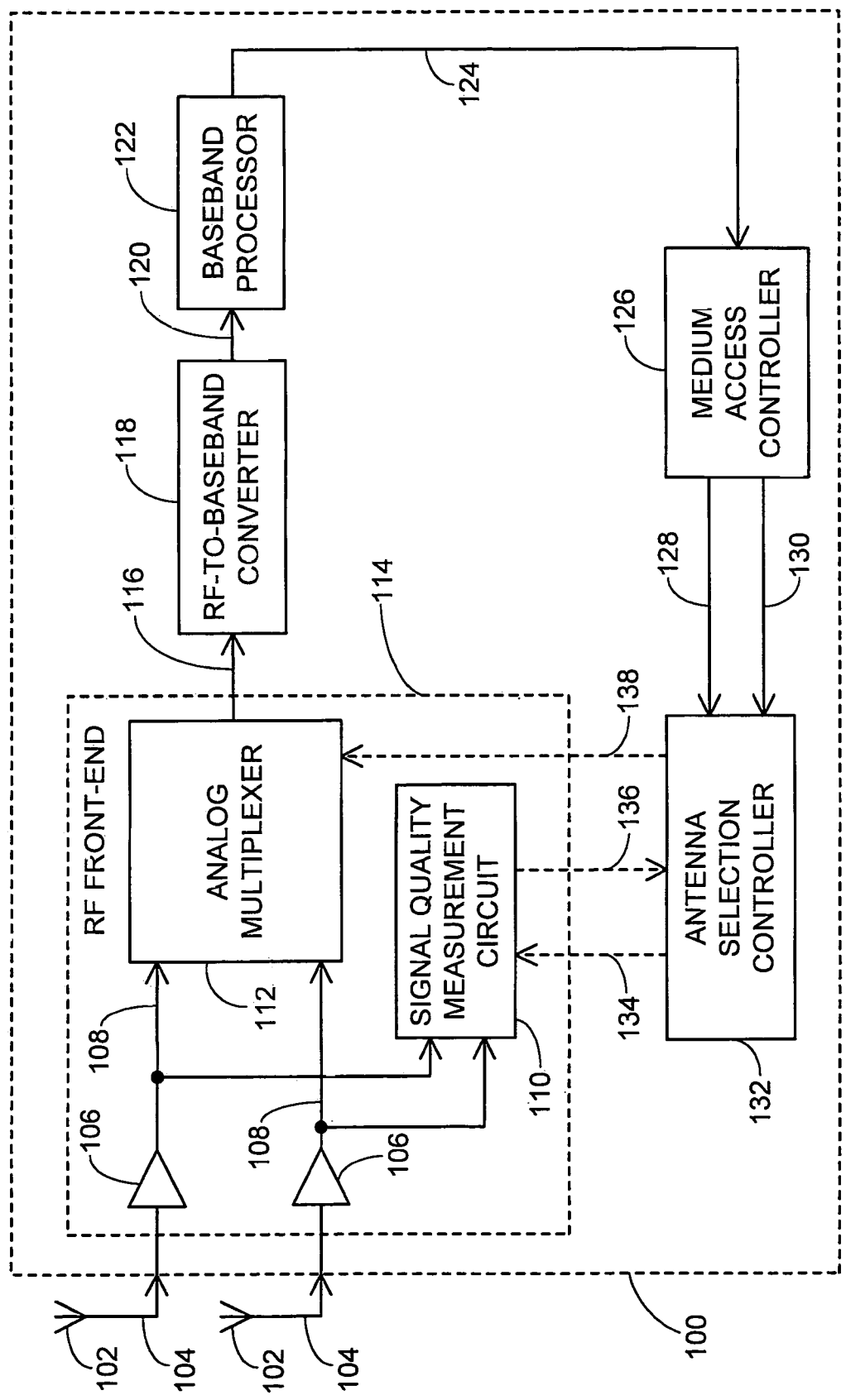
FIG. 2 is a schematic block-diagram illustration of an exemplary radio-frequency, space-diversity receiver belonging to the communication system described in FIG. 1.

Reference is now made to FIG. 2, in which an exemplary RF space-diversity receiver, in accordance with an embodiment of the present invention, is described. RF receiver 100 may belong to a communication system of the kind described in FIG. 1, and may, for example, be incorporated in access points (AP) and stations (STA) belonging to a wireless LAN working in accordance with IEEE standard 802.11g. RF receiver 100 may be connected to at least two receiving antennae 102, and may include an RF front-end 114, an RF-to-baseband converter 118, a baseband processor 122, a medium access controller 126, and an antenna selection controller 132.

Antenna signals 104 may be amplified by RF amplifiers 106, with amplified antenna signals 108 being passed on to a signal quality measurement circuit 110, and an analog multiplexer 112.

Signal quality measurement circuit 110 may measure quality parameters of amplified antenna signals 108, including signal quality parameters known to those skilled in the art as being useful for determining the best antenna to be selected in a space-diversity receiver, and which may include mean signal strength, signal-to-noise ratio, and others. Signal quality measurement circuit 110 may perform the aforementioned measurements when it receives a signal quality measurement request 134, and may deliver a set of measurement results by means of a signal quality measurement result signal 136.

Analog multiplexer 112 may couple an RF signal path from one of amplified antenna signals 108 to a selected amplified antenna signal 116. An antenna signal selector signal 138 may determine which of amplified antenna signals 108 is to be selected as the active antenna.

RF-to-baseband converter 118 may down-convert selected amplified antenna signal 116 from the original RF frequency and may deliver a baseband signal 120 to baseband processor 122. Baseband processor 122 may demodulate baseband signal 120 and reconstruct transmitted data frames known as MAC service data units (MSDUs), and may pass them on as an MSDU data stream 124 to medium access controller 126.

Medium access controller 126 may search for beacon frames in MSDU data stream 124, may calculate the time elapsing between successive beacon frame transmissions, known as the target beacon transmission time (TBTT), from a data field known as the beacon interval field included within the beacon frames, and may send to controller 132 a beacon received signal 128, and a TBTT value signal 130 indicating the calculated TBTT value.

Figure 3:
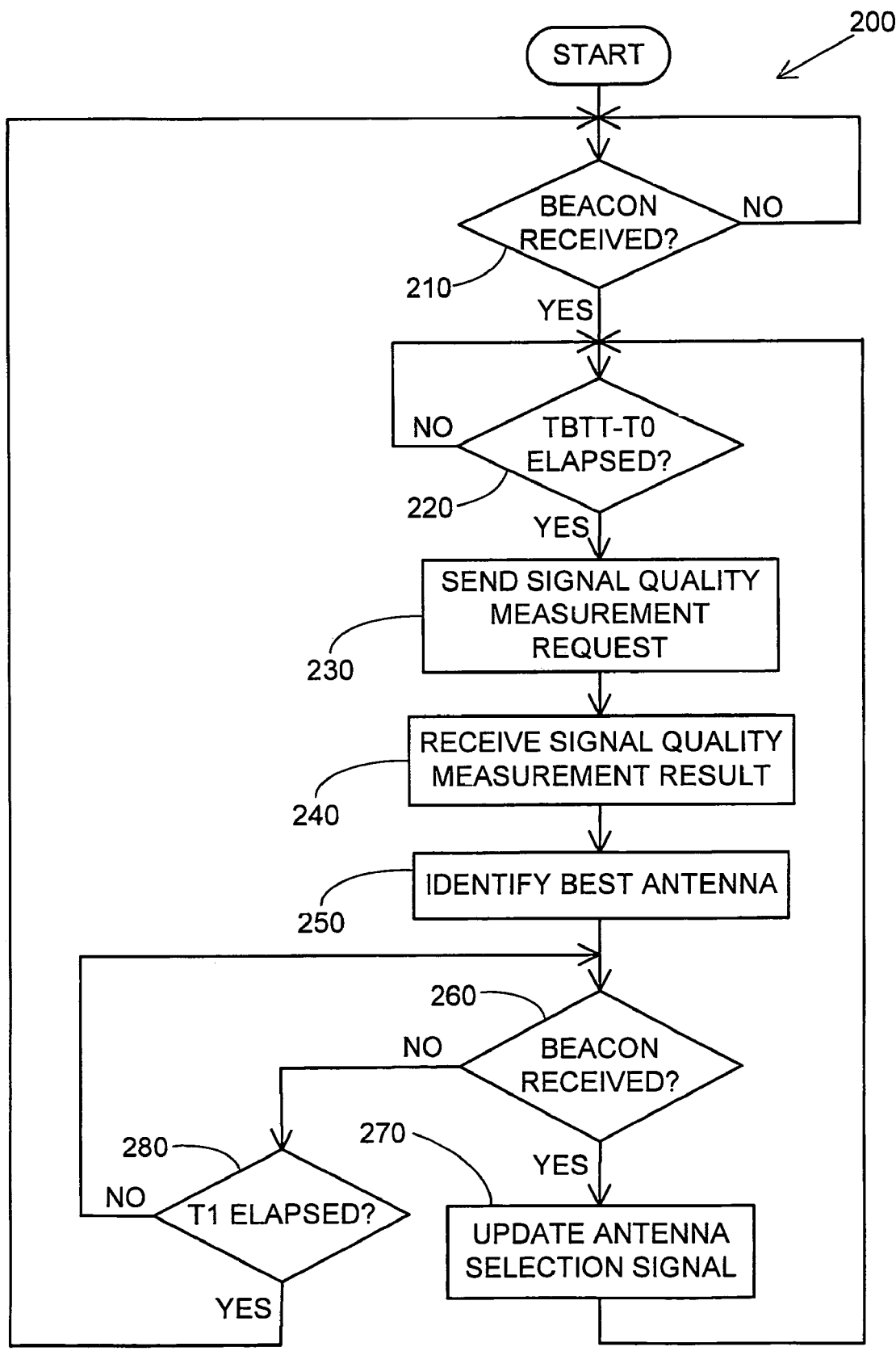
FIG. 3 is a schematic flowchart illustration of a method for antenna selection, using the radio receiver described in FIG. 2.

The operation of controller 132 in conjunction with medium access controller 126, signal quality measurement circuit 110 and analog multiplexer 112 is better understood if reference is made additionally to FIG. 3, in which a schematic flowchart illustration describes a method for antenna selection, according to an embodiment of the present invention.

Upon START, process 200 may wait for beacon received signal 128 to become active (block 210).

Receipt of the beacon received signal may be used to synchronize the initiation of a signal quality measurement. However, a phase difference exists between the receipt of beacon received signal 128 and the desired signal quality measurement time, which coincides with the beacon frame preamble field. Indeed, beacon received signal 128 may become active after the beacon frame preamble field. In order to compensate for this phase difference, the measurement of signal quality may be delayed by a certain period following receipt of beacon received signal 128. Specifically, the process may wait an interval TBTT-T0, where T0 is an interval that slightly exceeds the time that is known to elapse between the start of reception of the beacon frame preamble field and the delivery by medium access controller 126 of beacon received signal 128 (block 220). The end of this interval shortly precedes the anticipated reception of the next beacon frame, thereupon controller 132 may cause any transmitter connected to antennae 102 to temporarily suspend transmissions and may initiate a signal quality measurement by sending signal quality measurement request 134 to signal quality measurement circuit 110 (block 230).

Signal quality measurement circuit 110 may measure the quality of amplified antenna signals 108, and may send to controller 132 signal quality measurement result signal 136 containing a set of measurement results (block 240).

Controller 132 may identify the best reception antenna by comparing the results contained in signal quality measurement results signal 136 (block 250).

The anticipated beacon frame may not have been received, or may have been significantly delayed, as might occur during periods of heavy data traffic on the LAN. If the signal quality measurement just performed did not coincide with the preamble field of the anticipated beacon frame, then the measurement results may be considered invalid. Therefore, controller 132 may verify whether a beacon frame was indeed received by waiting for beacon received signal 128 to become active (block 260) unless interval T1 has elapsed, T1 being greater than the maximum expected interval required for medium access controller 126 to identify receipt of a beacon frame in MSDU data stream 124 and send beacon received signal 128 (block 280).

If a beacon frame was received within interval T1, controller 132 may send to analog multiplexer 112 a new value of antenna selection signal 138 corresponding to the best reception antenna identified in block 250 (block 270), thereafter the amplified signal from the selected antenna may be used for reception. The process may then repeat itself starting with controller 132 waiting during a new interval TBTT-T0 (block 220).

If a beacon frame was not received within interval T1, controller 132, maintains the previous value of antenna selection signal 138, the amplified antenna signal used for reception remains the one previously selected, and process 200 is repeated with controller 132 waiting for beacon received signal 128 to become active (block 210).

The RF receiver described in the embodiment will generally form a part of a transceiver, in which the antennae may or may not be shared between the transmitting and receiving functions, and the antenna selected for reception as described hereinabove may also be used for transmission until such time as a different antenna is selected for reception.

In another embodiment of the invention, the signal quality measurement circuit may act on the analog multiplexer output instead of on the amplified antenna signals. The controller, in coordination with the signal quality measurement circuit, may cause the analog multiplexer to switch between the multiple amplified antenna signals during the measurement period, thereby allowing the signal quality measurement circuit to measure the quality of each of the antenna signals.

In yet another embodiment of the invention, the assessment of the quality of the antenna signals may be performed during reception of the preamble field of a data frame that, as in the hereinbefore described embodiment, has a substantially longer preamble field than that of other data frames, but which is not received at substantially regular intervals.

In a further embodiment of the invention, the initiation of assessments of the quality of antenna signals may be synchronized to a data frame or other specifically-recognizable element of the data-bearing signal that is repeated periodically at substantially regular intervals, known as synchronization intervals, rather than being synchronized to the same data frame during which the signal quality measurements are made.

In a further embodiment of the invention, the initiation of assessments of the quality of antenna signals may be synchronized to a specifically-recognizable element of a separate synchronizing signal, rather than to a data frame or other recognizable element of the data-bearing signal itself.

In a further embodiment, a separate synchronizing signal may contain the data field from which the length is determined of the substantially regular intervals between data frames having a substantially longer preamble field than that of other data frames.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A method for space diversity reception comprising:
   selecting from two or more antennae an active antenna that delivers a data-bearing signal having a signal quality at least as good as any of said antennae based upon measurements of said signal quality during reception of a preamble field of data frames having a substantially longer preamble field than other data frames, said data frames having a substantially longer preamble field than that of other data frames are received at substantially regular intervals;
   initiating said measurements of said signal quality periodically in anticipation of reception of said data frames having a substantially longer preamble field than that of other data frames;
   determining a length of said substantially regular intervals from a data field included in said data-bearing signal or in a synchronizing signal;
   initiating said measurements of said signal quality at intervals substantially equal in length to said length of said substantially regular intervals; and
   synchronizing said measurements of said signal quality to a specifically-recognizable element repeated periodically at substantially regular synchronization intervals of said data-bearing signal or said synchronizing signal.

2. The method of claim 1, wherein said data-bearing signal is generated according to IEEE standard 802.11g.

3. The method of claim 2, wherein said data frames having a substantially longer preamble field than that of other data frames are beacon frames.

4. The method of claim 1, further comprising;
   delaying initiation of said measurements of said signal quality to compensate for a phase difference between said substantially regular intervals and said substantially regular synchronization intervals.

5. The method of claim 1, wherein said substantially regular intervals have a substantially identical duration to said substantially regular synchronization intervals.

6. The method of claim 1, wherein said substantially regular intervals have a substantially identical duration and phase to said substantially regular synchronization intervals.

7. The method of claim 1, wherein said synchronizing signal is said data-bearing signal.

8. The method of claim 1, wherein said data field is a beacon interval field belonging to an IEEE standard 802.11g beacon frame.

9. The method of claim 1, wherein said specifically-recognizable element repeated periodically at substantially regular synchronization intervals is an IEEE standard 802.11g beacon frame.

10. A communication device comprising:
two or more monopole antennae; and
a receiver including at least;
  an analog multiplexer to select a data-bearing signal from one of said antennae;
  a signal quality measurement circuit to measure received signal quality from each of said antennae;
  an antenna selection controller to instruct said signal quality measurement circuit to measure said signal quality during reception of a preamble field of data frames having a substantially longer preamble field than other data frames, said controller also to identify from said two or more antennae an antenna that delivers a data-bearing signal having a signal quality at least as good as any of said antennae and to command said analog multiplexer to select said data-bearing signal from said antenna; and
  a medium access controller to extract data frames from a down-converted and demodulated version of said data-bearing signal and to provide to said antenna selection controller indications of occurrences of said data frames having a substantially longer preamble field than other data frames, wherein said medium access controller is to provide to said antenna selection controller an indication of the time elapsing between successive occurrences of said data frames having a substantially longer preamble field than other data frames.

11. The communication device of claim 10, wherein said receiver further includes:
  a baseband processor coupled to said analog multiplexer to process a down-converted version of said data-bearing signal according to IEEE standard 802.11g.

12. The communication device of claim 11, wherein said data frames having a substantially longer preamble field than other data frames are beacon frames.

13. A communication device comprising:
two or more monopole antennae; and
a receiver including at least:
  an analog multiplexer to select a data-bearing signal from one of said antennae;
  a signal quality measurement circuit to measure received signal quality from each of said antennae on receipt of a signal quality measurement request signal, and deliver a signal quality measurement result signal;
  a medium access controller to extract data frames from a down-converted and demodulated version of said data-bearing signal and to provide indications of occurrences of said data frames having a substantially longer preamble field than other data frames and which are received at substantially regular intervals; and
  an antenna selection controller to monitor said indications of occurrences of data frames having a substantially longer preamble field than other data frames and which are received at substantially regular intervals, to send said signal quality measurement request signal periodically in anticipation of reception of said data frames having a substantially longer preamble field than other data frames, to identify from said signal quality measurement result signal an antenna that delivers a data-bearing signal having a signal quality at least as good as any of said antennae and to command said analog multiplexer to select said data-bearing signal from said antenna.

14. The communication device of claim 13, wherein said media access controller is to determine a length of said substantially regular intervals from a data field included in said data-bearing signal or in a synchronizing signal and to indicate occurrences of a specifically-recognizable element repeated periodically at substantially regular synchronization intervals of said data-bearing signal or said synchronizing signal.

15. The communication device of claim 14, wherein said antenna selection controller is to send said signal quality measurement circuit request signal at intervals substantially equal in length to said length of said substantially regular intervals and to synchronize said signal quality measurement request signal to said occurrences of said specifically-recognizable element.

16. The communication device of claim 15, wherein said antenna selection controller is to delay sending said signal quality measurement request signal to compensate for a phase difference between said substantially regular intervals and said substantially regular synchronization intervals.

17. The communication device of claim 13, wherein said receiver further includes:
  a baseband processor coupled to said analog multiplexer to process a down-converted version of said data-bearing signal according to IEEE standard 802.11g.

18. The communication device of claim 17, wherein said data frames having a substantially longer preamble field than other data frames are beacon frames.

19. A communication system comprising:
  a first communication device including at least a transmitter; and
  a second communication device including at least:
    two or more monopole antennae; and
    a receiver including at least:
      an analog multiplexer to select a data-bearing signal from one of said antennae;
      a signal quality measurement circuit to measure received signal quality from each of said antennae on receipt of a signal quality measurement request signal, and deliver a signal quality measurement result signal;
      a medium access controller to extract data frames from a down-converted and demodulated version of said data-bearing signal and to provide indications of occurrences of said data frames having a substantially longer preamble field than other data frames and which are received at substantially regular intervals; and
      an antenna selection controller to monitor said indications of occurrences of data frames having a substantially longer preamble field than other data frames and which are received at substantially regular intervals, to send said signal quality measurement request signal periodically in anticipation of reception of said data frames having a substantially longer preamble field than other data frames, to identify from said signal quality measurement result signal an antenna that delivers a data-bearing signal having a signal quality at least as good as any of said antennae and to command said analog multiplexer to select said data-bearing signal from said antenna.

20. The communication system of claim 19, wherein said media access controller is to determine a length of said substantially regular intervals from a data field included in said data-bearing signal or in a synchronizing signal and to indicate occurrences of a specifically-recognizable element repeated periodically at substantially regular synchronization intervals of said data-bearing signal or said synchronizing signal.

21. The communication system of claim 19, wherein said receiver further includes:

a baseband processor coupled to said analog multiplexer to process a down-converted version of said data-bearing signal according to IEEE standard 802.11g, wherein said data frames having a substantially longer preamble field than other data frames are beacon frames.

* * * * *